(12) United States Patent
Chan et al.

(10) Patent No.: US 11,449,879 B2
(45) Date of Patent: Sep. 20, 2022

(54) METHOD AND SYSTEM FOR PROVIDING NOTIFICATIONS

(71) Applicant: GPVTL CANADA INC., Palo Alto, CA (US)

(72) Inventors: Boris Kai-Tik Chan, Toronto (CA); Sundeep Singh Madra, Palo Alto, CA (US); Jonathan Mikhail, Toronto (CA); David Protasowski, Oshawa (CA); Sina Sojoodi, Toronto (CA); Amar Varma, Toronto (CA)

(73) Assignee: VMware, Inc., Palo Alto, CA (US)

( * ) Notice: Subject to any disclaimer, the term of this patent is extended or adjusted under 35 U.S.C. 154(b) by 106 days.

(21) Appl. No.: 16/921,808

(22) Filed: Jul. 6, 2020

(65) Prior Publication Data

US 2020/0334693 A1 Oct. 22, 2020

Related U.S. Application Data

(63) Continuation of application No. 13/558,749, filed on Jul. 26, 2012, now abandoned.

(60) Provisional application No. 61/513,449, filed on Jul. 29, 2011.

(51) Int. Cl.

| | |
|---|---|
| *G06F 15/16* | (2006.01) |
| *G06Q 30/02* | (2012.01) |
| *G06Q 50/00* | (2012.01) |
| *H04L 51/52* | (2022.01) |
| *H04L 51/212* | (2022.01) |
| *H04L 67/50* | (2022.01) |

(52) U.S. Cl.
CPC .............. *G06Q 30/02* (2013.01); *G06Q 50/01* (2013.01); *H04L 51/212* (2022.05); *H04L 51/52* (2022.05); *H04L 67/535* (2022.05)

(58) Field of Classification Search
CPC ........ G06Q 30/02; G06Q 50/01; H04L 51/12; H04L 51/32; H04L 67/22
USPC .......................................................... 709/206
See application file for complete search history.

(56) References Cited

U.S. PATENT DOCUMENTS

| | | | |
|---|---|---|---|
| 7,801,971 B1 * | 9/2010 | Amidon | H04L 51/32 |
| | | | 709/217 |
| 8,355,955 B1 | 1/2013 | Mirchandani et al. | |
| 8,539,030 B2 | 9/2013 | Baldonado et al. | |
| 8,832,188 B1 | 9/2014 | Cieriak | |
| 9,614,807 B2 * | 4/2017 | Spivack | G06N 5/046 |
| 2005/0192955 A1 | 9/2005 | Farrell | |
| 2006/0031313 A1 | 2/2006 | Libbey et al. | |
| 2007/0226248 A1 | 9/2007 | Darr | |

(Continued)

FOREIGN PATENT DOCUMENTS

WO WO 2010/149312 6/2010

*Primary Examiner* — Schquita D Goodwin
(74) *Attorney, Agent, or Firm* — Fish & Richardson P.C.

(57) ABSTRACT

A computer-based method is provided for selectively providing notifications based on social relevance to a user. The notification is first parsed to determine a sender, a proposed recipient, and at least one topic addressed in the notification. The parsed notification is then evaluated against a social graph of the proposed recipient. A relevance score is assessed based on linkages traversed in the social graph to a predetermined degree of separation from the proposed recipient. The score is increased for linkages that match or relate to the at least one topic. The notification is released to the proposed recipient if the relevance score exceeds a predetermined threshold.

20 Claims, 4 Drawing Sheets

(56) References Cited

U.S. PATENT DOCUMENTS

| | | | |
|---|---|---|---|
| 2008/0189169 A1 | 8/2008 | Turpin et al. | |
| 2008/0228761 A1 | 9/2008 | Leung et al. | |
| 2008/0294617 A1 | 11/2008 | Chakrabarti et al. | |
| 2009/0216551 A1* | 8/2009 | Chen | G06F 16/907 707/999.005 |
| 2009/0265431 A1 | 10/2009 | Jania et al. | |
| 2010/0049702 A1 | 2/2010 | Martinez et al. | |
| 2010/0169364 A1 | 7/2010 | Hardt | |
| 2010/0174709 A1 | 7/2010 | Hansen | |
| 2010/0185507 A1 | 7/2010 | Tokuda | |
| 2010/0287250 A1 | 11/2010 | Carlson et al. | |
| 2010/0312650 A1 | 12/2010 | Pinckney et al. | |
| 2010/0318613 A1* | 12/2010 | Souza | G06Q 10/107 709/206 |
| 2011/0093346 A1 | 4/2011 | Lunt et al. | |
| 2011/0238735 A1 | 9/2011 | Gharpure | |
| 2011/0252011 A1 | 10/2011 | Morris et al. | |
| 2011/0270703 A1 | 11/2011 | Engle | |
| 2011/0289011 A1 | 11/2011 | Hull et al. | |
| 2011/0320541 A1 | 12/2011 | Bendel et al. | |
| 2011/0320542 A1 | 12/2011 | Bendel et al. | |
| 2012/0001919 A1 | 1/2012 | Lumer | |
| 2012/0005224 A1 | 1/2012 | Ahrens et al. | |
| 2012/0005238 A1 | 1/2012 | Jebara et al. | |
| 2012/0029992 A1 | 2/2012 | De Facendis | |
| 2012/0036015 A1 | 2/2012 | Sheikh | |
| 2012/0042392 A1 | 2/2012 | Wu | |
| 2012/0066618 A1* | 3/2012 | Barker | H04L 12/1813 715/753 |
| 2012/0072996 A1* | 3/2012 | Svendsen | H04L 51/28 726/28 |
| 2012/0102130 A1* | 4/2012 | Guyot | H04L 51/12 709/206 |
| 2012/0110080 A1 | 5/2012 | Panyam et al. | |
| 2012/0110085 A1* | 5/2012 | Malik | G06F 16/2228 709/205 |
| 2012/0110096 A1 | 5/2012 | Smarr et al. | |
| 2012/0166433 A1 | 6/2012 | Tseng | |
| 2012/0166452 A1* | 6/2012 | Tseng | H04L 65/403 707/749 |
| 2012/0233259 A1* | 9/2012 | Work | G06Q 10/1053 709/204 |
| 2012/0239763 A1* | 9/2012 | Musil | G06Q 50/01 709/206 |
| 2012/0278172 A1 | 11/2012 | Mercuri et al. | |
| 2012/0304087 A1 | 11/2012 | Walkin | |
| 2012/0324027 A1 | 12/2012 | Vaynblat et al. | |
| 2013/0024464 A1 | 1/2013 | Berner et al. | |
| 2013/0029765 A1* | 1/2013 | Parks | A63F 13/46 463/42 |
| 2013/0031171 A1 | 1/2013 | Serena | |
| 2013/0311563 A1* | 11/2013 | Huberman | H04L 67/22 709/204 |
| 2014/0095303 A1 | 4/2014 | Jones | |
| 2014/0101197 A1 | 4/2014 | Charytoniuk | |

* cited by examiner

METHOD AND SYSTEM FOR PROVIDING NOTIFICATIONS

CROSS REFERENCE TO RELATED APPLICATION

This application is a continuation application of U.S. application Ser. No. 13/558,749, filed on Jul. 26, 2012, which claims priority from U.S. Provisional Application No. 61/513,449 filed on Jul. 29, 2011, both of which are incorporated by reference in their entirety herein.

FIELD OF THE INVENTION

The field of the invention relates to methods and systems for communication of notifications in a computer-enabled network. More particularly, provision of notifications is determined in part by relevancy evaluated by characteristics of a social graph.

BACKGROUND OF THE INVENTION

Notifications in the context of the present invention are short unidirectional messages that may be of relevance to the recipient from online services. They are commonly in the form of email, text messages (SMS) and instant messages. Topics may include, but are not limited to, weather warnings, breaking world news and stock market alerts.

Such notifications are frequently broadcast to a wide audience with little in common and having, on average, no particular interest in the topic of the notification. In other words, notifications are sent to people who do not want them or who ought not to receive them. This dilutes the quality of notifications and when there is an excess, notifications may become unmanageable to users. Users may decide to ignore the notifications or deal with them later, defeating their purpose as a source of relevant, timely bursts of information.

In some notifications systems, users may be able to manually set preferences, such as whether to receive notifications or time of day to receive them, but by and large, control is held by the notification sender, not the receiver. Even when preferences settings are available to recipients, many users may find that configuring notifications criteria is too time consuming or difficult to manage. The user may prefer simply to delete such notifications as they come up, which does not provide any meaningful feedback to the sender (or content provider) of such notifications.

SUMMARY OF THE INVENTION

It would be desirable to provide a means for selectively providing notifications based on social relevance to enable:
(1) targeting individuals or clusters of people who are genuinely interested in a particular topic;
(2) targeting key individuals with a lot of activity and/or friends (who may be more likely to take a specific action or convince others to take a specific action in response to a notification—such as buying a product or service);
(3) targeting notifications to individuals while their interest in a topic is at its peak.

According to a first aspect of the invention, a method is provided for selectively providing notifications based on social relevance to a user. The method uses a programmed computer to automatically carry out each step of the method. The notification is first parsed to determine a sender, a proposed recipient, and at least one topic addressed in the notification. The parsed notification is then evaluated against a social graph of the proposed recipient. A relevance score is assessed based on linkages traversed in the social graph to a predetermined degree of separation from the proposed recipient. The score is increased for linkages that match or relate to the at least one topic. The notification is released to the proposed recipient if the relevance score exceeds a predetermined threshold.

The notification may also be released to at least one friend or neighbor of the proposed recipient, where the friend or neighbor is linked with the proposed recipient in the proposed recipient's social graph. The at least one friend or neighbor may be specifically selected based on degree of closeness to the proposed recipient as determined from the social graph.

In one embodiment, the linkages are assessed using either or a combination of keyword matching and fuzzy logic.

Prior to evaluating the notification, the method may determine whether the notification is a public or private notification for the proposed recipient. In this case, the method may proceed with the remaining steps only if the notification is public. If the notification is private, the notification may be released directly to the proposed recipient without evaluating the notification against the social graph.

Various steps may be taken if the relevance score fails to meet the threshold. The notification may simply be discarded if the relevance score does not exceed the threshold. Alternatively, the notification may be held for further instructions or consent to release.

The relevance score may further include a weighting of the relevance of the topic to at least one friend or neighbor of the proposed recipient in the proposed recipient's social graph. Thus, the score might be increased (making it more probable to send the notification to the proposed recipient) if the proposed recipient's friends/neighbors also have an interest in that topic.

In one embodiment, the social graph is hosted by a social networking site. The social graph may be queried using a social graph API of the social networking site. The linkages in the social graph may be based on activities or settings related to the proposed recipient on the social networking site. Further, the linkages in the social graph may also be based on activities or settings related to the proposed recipient at other sites linked to or accessible via the social networking site.

The social graph may be traversed to a distance of at least two degrees of separation from the proposed recipient.

The relevance score is preferably increased to a greater extent for linkages with greater connectedness to (or stronger association with) the proposed recipient.

The relevance score is preferably increased to a greater extent for linkages more proximate to (i.e., less remote/removed from, at fewer degrees of separation from) the proposed recipient.

The relevance score preferably takes into account the directionality of linkages. A linkage or association can be unidirectional or bidirectional.

The relevance score preferably takes into account the recency of linkages. For example, the relevance score may be increased to a greater extent for more recent linkages.

The evaluation portion of the method may be by-passed in certain circumstances. For example, if the sender is on a black-list set by the proposed recipient (i.e. an "always deny" setting), the notification may be automatically discarded. That is, the method may only proceed with the remaining steps if the sender is not black-listed.

Conversely, if the sender is on a white-list set by the proposed recipient (i.e. an "always allow" setting), the notification may be released directly to the proposed recipient without evaluating the notification against the social graph.

Alternatively, the evaluation portion of the method may itself be informed by user preferences and input, which may be part of the social graph.

DETAILED DESCRIPTION

The present invention seeks to introduce a computer-based method and system by which filtering of notifications can occur with little intervention from the recipient but which nevertheless enhances relevancy of notifications. In this way, the present invention is an advance over traditional methods of notification. It does so by use of a social relevancy engine (SRE).

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. LAMP (Linux, Apache, MySQL and PHP) is an example of a well-known open-source Web development platform. Other examples of environments and frameworks in which computer code may also be generated are Ruby on Rails which is based on the Ruby programming language, or node.js which is an event-driven server-side JavaScript environment.

The program code may execute entirely on the client device, partly on the client device, as a stand-alone software package, partly on the client device and partly on a remote computer or entirely on the remote computer or server. In the latter scenario, the remote computer may be connected to the client device through any type of network, including a local area network (LAN) or a wide area network (WAN), or the connection may be made to an external computer (for example, through the Internet using an Internet Service Provider).

It will be understood that the device enables a user to engage with an application using the invention, and includes a memory for storing a control program and data, and a processor (CPU) for executing the control program and for managing the data, which includes user data resident in the memory and includes buffered content. The device may be coupled to an external video display such as a television, monitor, or other type of visual display, in addition to or as an alternative to an onboard display. Storage media may be onboard or external, such as a DVD, a CD, flash memory, USB memory or other type of memory media or it may be downloaded from the Internet. The storage media can be inserted to the device where it is read. The device can then read program instructions stored on the storage media and present a user interface to the user.

In preferred embodiments, the client device is fully mobile and portable (e.g. a laptop, a notebook, a cellular phone, a smartphone, a PDA, an iPhone, an iPad, an iPod, an iPad, an e-book reader e.g. Kindle or Kindle DX, Nook, etc.), although it will be appreciated that the method could be applied to more fixed (non-portable) computers and related devices with appropriate modifications (e.g. a personal computer (PC), corporate PC, a server, a PVR, a set-top box, wireless enabled Blu-ray player, a TV, a SmartTV, wireless enabled Internet radio) and other such devices that may be used for the viewing and consumption of content whether the content is local, is generated on demand, is downloaded from a remote server where it exists already or is generated as a result.

The software of the present invention can be implemented in a standalone configuration or in combination with other software programs and is not limited to any particular operating system or programming paradigm described here. Thus, this invention intends to cover all applications and user interactions described above as well as those obvious to the ones skilled in the art.

Several exemplary embodiments/implementations of the invention have been included in this disclosure. There may be other methods obvious to persons skilled in the art, and the intent is to cover all such scenarios. The application is not limited to the cited examples, but the intent is to cover all such areas that may be benefit from this invention.

The source device (or server) where content is located or generated and recipient device (or client) where content is consumed may be running any number of different operating systems as diverse as Microsoft Windows family, MacOS, iOS, any variation of Google Android, any variation of Linux or Unix, PalmOS, Symbian OS, Ubuntu or such operating systems used for such devices available in the market today or the ones that will become available as a result of the advancements made in such industries.

In order to understand the present invention, it is helpful to first understand the concept of social graphs and social networks in general.

A social networking service is an online service or a platform or a website that provides the means for people to build their social networks reflecting their social relationships with other people. Typically a social network service consists of a representation of each person via a profile, each person's social connections and their interests. Today most social networking services are web-based and also provide means for people to interact with each other through e-mail, instant messaging, online chats, etc. Social networking websites allow people to share ideas, activities, events, and interests within their individual networks.

Facebook, Twitter, LinkedIn and Google+ are some examples the most popular current social networking websites. Social networking websites share a variety of technical features. The most basic of these are visible profiles usually with a list of "friends" who are also users of the site. Some social networking websites allow people to upload pictures, add multimedia content to uniquely individualize the look and feel of their profiles. Facebook even allows people to enhance their profiles by adding modules or applications.

Profiles often have a section dedicated to comments from friends and other users. To protect user privacy, social networks typically have controls that allow users to choose who can view their profile, contact them, add them to their list of contacts, and so on.

A graph is a mathematical concept that is a representation of a set of objects where some pairs of the objects are connected by links. The interconnected objects are represented by abstractions called vertices (or nodes), and the links that connect some pairs of vertices are called edges. Typically, a graph is depicted in diagrammatic form as dots for the vertices joined by lines for edges. The edges may be directed (asymmetric, unidirectional) or undirected (symmetric, bidirectional) to represent cause-effect, material/data flow, "friendly" or other types of relationships.

When the graph is applied to describe the relationships between individuals, it is referred to as a social graph. In a commonly accepted definition, a social graph is a mapping of a set of people and how they're related. Typically, a social graph describes the relationships between individuals online as opposed to the concept of a social network, which describes relationships in the real world. The two concepts are similar but some minor differences exist. For example, the social graph is digital, better suited for mathematical abstractions thus computer programming, and it is defined explicitly by all connections involved. A concrete example of a social network is where the vertices represent people (or entities in general) at a party and edges as interactions between them.

Said another way, a social graph is a representation of the interconnection of relationships in an online social network. A social graph is a mapping of people and how they are related or connected to other people. In a social graph, each person is a node. There is an explicit connection, if two people know each other, for example, two people can be connected because they work together or because they went to school together or because they are married. The links between people in social networks are of different types; and the different types of relationships can be a friend, a co-worker, a family member, a classmate, a schoolmate, etc.

There may be at least two kinds of relationships: one-way relationships and two-way relationships. An example of a one-way relationship is a person subscribing to or following a celebrity. In this kind of relationship, the person subscribing or following needs to start the relationship. An example of a two-way relationship is a person sending a "friend" request to another person, and the second person then confirming the "friend" request before the relationship is established. Thus in a two-way relationship if the recipient of the "friend" request does not confirm this request there is no relationship between the two people in the social graph.

Figure 4:
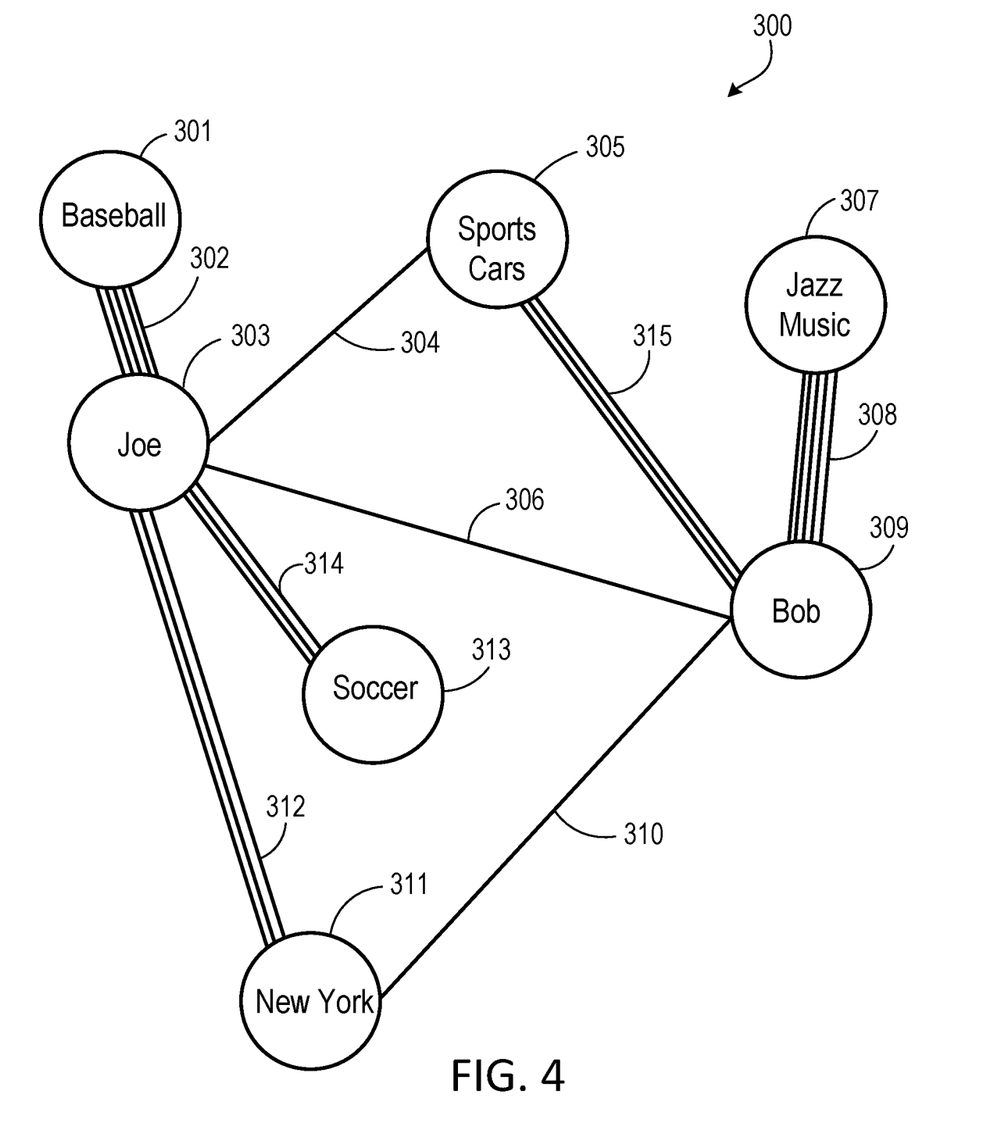
FIG. 4 is a conceptual diagram of a simplified social graph for user Joe.

For example, a sample social graph for a user named Joe is shown conceptually in FIG. 4.

FIG. 4 shows a sample social graph 300 for a user of a social network named Joe. Joe's node 303 is connected to other nodes—some are other users (e.g. Bob 309), while others are topics of interest to Joe based on his profile, activity and available information about Joe from the social network and related sites. In this case, Joe is connected to nodes for baseball 301, soccer 313 and sports cars 305. Joe is also connected to New York 311 (this may be where Joe lives (as per his profile) or it may be a place he is interested in for some other reason (e.g. grew up there, or wants to visit). Joe 303 is connected to another user, Bob 309. Bob 309 may be a friend, colleague, professional contact, or acquaintance of Joe 303 (or perhaps even a celebrity that Joe follows). Bob 309 shares Joe's interest in sports cars 305 and New York 311. Based on the linkages in the graph, Bob is not interested in baseball 301 or soccer 313, but he is interested in jazz music 307.

As illustrated, Joe and Bob are one degree of separation from each other (i.e. they are in direct connection through linkage 306). Joe is two degrees of separation away from jazz music.

The linkages between the nodes also deserve mention. Nodes may be more or less "associated" or "connected" with each other (i.e. their linkages may be thought of as "thicker" or "denser" referring to the strength of the association). This increased connectedness may arise due to a higher frequency of a topic (or another individual) in the user's activities, or due to other weighting factors (e.g. recency of activity related to that node). Note, for example, that the thickest (most closely associated) linkages shown in the diagram are 308 (between Bob and jazz music) and 302 (between Joe and baseball). These are indicative of strong interest/strong relevance. Joe has less interest in New York (see linkage 312) and soccer (see linkage 314) than he does in baseball (see linkage 302). He has low interest in sports cars (see linkage 304).

Bob has low interest in New York (linkage 310), but greater interest in sports cars (linkage 315) and very great interest in jazz music (linage 308).

The present invention uses this rich source of information about gradations of user interest in topics (i.e. relevance of those topics to the user) to determine release instructions for automated notifications. This avoids notifications being sent to users with little or no interest in the topic.

Systems and methods disclosed herein provide an improved notification technique to mitigate at least some of the current disadvantages of traditional methods. By intermediating transactions between the notification system and the client, the present invention is able to selectively filter and prioritize notifications such that their relevancy to the recipient is enhanced. The proposed approach is to pass each notification for a given recipient through a filter (the SRE)

that leverages existing data in the form of relationships (the social graph) at a social networking site.

Figure 1:
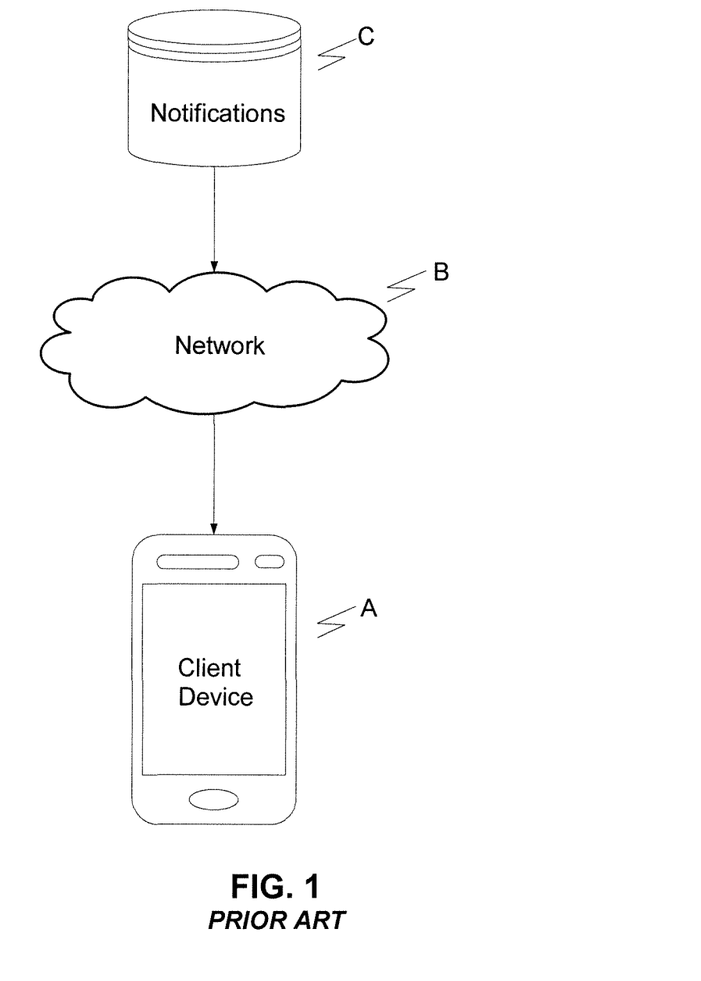
FIG. 1 is a block diagram of the prior art unfiltered notification systems.

Currently in some prior art systems, notifications are provided as depicted in FIG. 1. A client device A (e.g. a mobile device) is connected to a network B (e.g. using the Internet and wireless carriers). A notifications system C is comprised of one or more combinations of centralized or decentralized data processing and storage systems which output notifications to all recipients through the network. Recipients' addresses are stored in the database. The notifications pass untested and unverified directly to the client devices of the recipients without regard to relevance.

By contrast, in the present invention (as shown in the system 200 in FIG. 2) a social relevance engine (SRE) 103 is provided as an intermediary between the client 101 and notification system 104. The SRE implements the concepts of social graphs into a useful tool. Types of relationships can be defined using tags which are applied to the edges (lines connecting the vertices). Examples of relationships are "friend" or a preferred type of peer who have credibility and share common interests. Vertices and edges in a social graph can be variables used in software. The SRE requires that users have an account at a social network site that is associated with the incoming notification in order to access the appropriate portion of the social graph. It also requires that the notification recipient's unique address—such as email and unique network location of the client device—be registered or discoverable.

Figure 2:
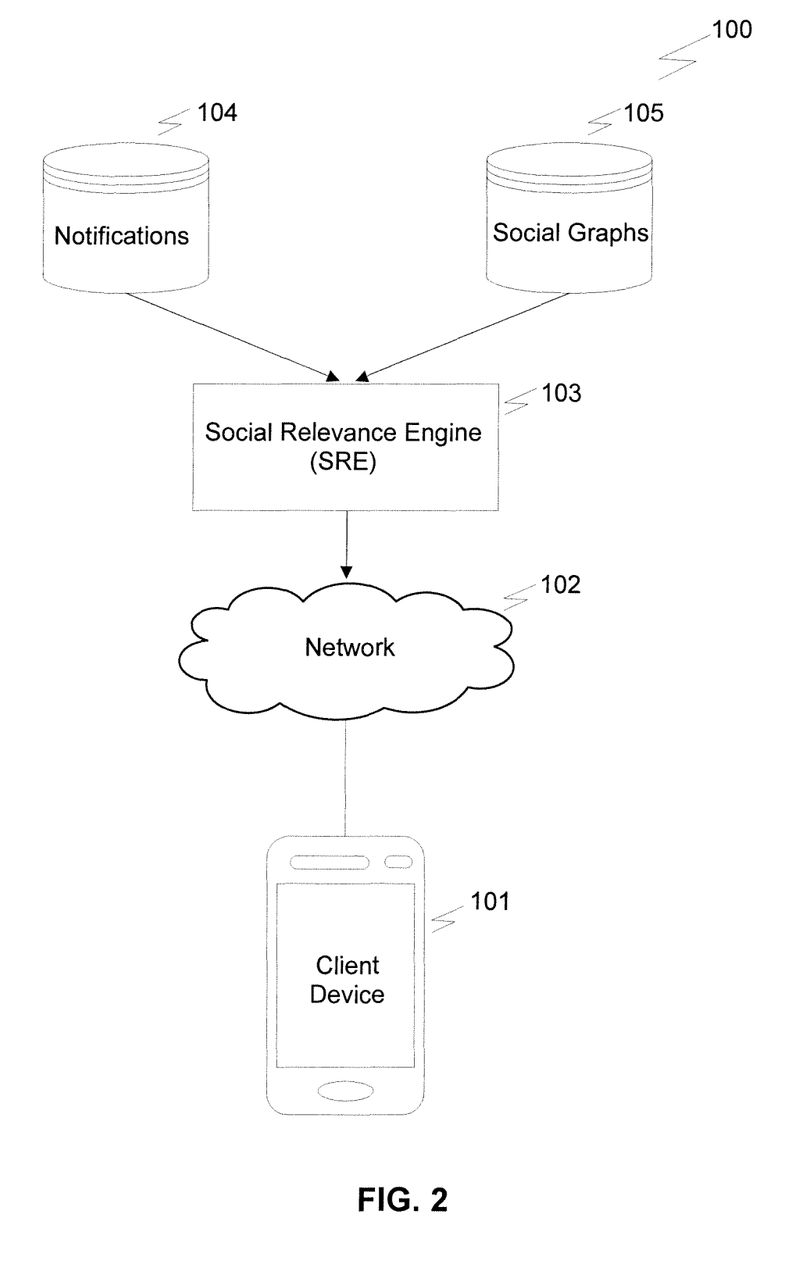
FIG. 2 is a block diagram of the present invention in which the notification system is intermediated by a social relevance engine linked to social graphs.

Social graphs at a social networking site 105 are referenced by the SRE 103. The present invention improves upon traditional notification systems by introducing the SRE 103 and use of social graphs 105. These elements intermediate transactions between the notification system and the client to whom notifications may be sent. In doing so, the present invention is able to selectively filter and prioritize notifications such that their relevancy to the recipient is enhanced. This is accomplished by the SRE examining notifications in relation to social graph data. The SRE then helps to determine how to process incoming notifications and who they should be sent to.

The SRE may reside at the notification provider or at the social network site. In an alternative embodiment, the SRE resides at the social network site.

Figure 3:
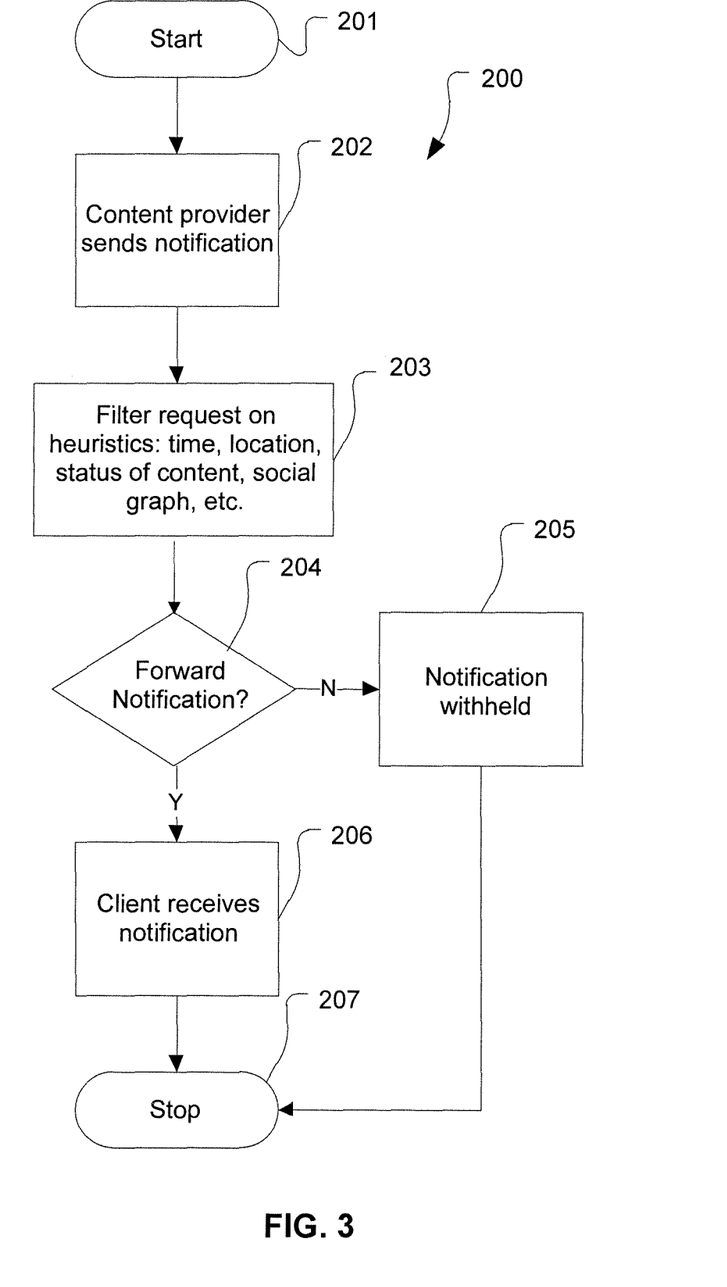
FIG. 3 is a flow diagram representing a simplified version of the present method.

A basic overview of the broad outlines of the method is provided in FIG. 3. The method will be described below in greater detail with respect to specific reference to the components in FIG. 2.

As shown in FIG. 3, the method starts 201 by receiving a notification from a content provider 202. This notification may be passed through various optional filters (time, location, status of content), and is parsed by the SRE and reviewed against the proposed recipient's social graph 203. If it is determined 204 from this review that the notification passes the test for relevance, it is released to the proposed recipient and the client receives the notification 206. Otherwise, the notification may be withheld or discarded without releasing it to the client 205. (Although the method is shown as stopping 207 after the release or non-release of the notification, in practice, there will frequently be a need to repeat the process (e.g. new or updated notifications, or changes in a user's social graph that may cause notifications that were previously considered irrelevant to now be relevant.)

Returning to FIG. 2, six stages of the method are now described in more detail with reference to the system 100 of components set out in FIG. 2.

In the first stage, notifications 104 are received by the SRE 103 when the content provider sends a notification. The SRE parses data in the notification. Data includes, but is not limited to, sender and recipient data, which will be utilized in the next stage. It also holds in memory the subject and message content.

In the second stage where filtration heuristics occur, the SRE 103 determines whether it is a private or publicly broadcasted message. If it is a private notification, such as banking or other personal account information, the notification can be passed directly to the recipient without further processing or filtering. The heuristic stage may alternatively be placed prior to the SRE as a separate processing unit. Private vs. public notifications may be determined in a number of ways. Users may configure a white-list (or black-list) of senders, message subjects, keywords or other distinctions. The SRE may determine whether a notification is public when the message, identical apart from form fields such as name, is sent to numerous individuals.

In the third stage, the SRE 103 sends the parsed notification data to a social networking site through an application programming interface (API) provided by them to query their subset of the social graph 105 to obtain information about its users, in particular the proposed recipient of the notification. Users are vertexes (or nodes) in the social graph. The social graph is examined for edges (linkages) connected to the vertex (user) in question. It follows the edges (linkages) through a pre-configured number of vertexes away from the origin (i.e., a pre-determined number of degrees of separation). For example, immediate relationships may always be included for examination as well as, say, the very next vertex but not another after that set. The purpose of this is to gather all relevant vertexes in the social graph (other social networking site users).

In the fourth stage, the SRE 103 examines the relevant vertexes found in the previous stage—some linked to other people and some linked to topics.

In the first aspect of the fourth stage, the SRE determines whether other people linked to the proposed recipient are also recipients of the same message.

In the second aspect of the fourth stage, using a comparison operation in the heuristics, the SRE finds matches in keywords. Keywords for basis of comparison are obtained from the notification topic and message content. Keywords can be searched in tags explicitly inputted by or on behalf of the proposed recipient in their profile such as geographic location (home base and current checked-in locale), interests, occupation and other activities. Keywords may also be obtained from parsing of the proposed recipient's digital or social media content. The method employed may be, but is not limited to, a semantics or natural language heuristics system similar to that of search engines.

In the third aspect of the fourth stage, pre-configured relationships (defined by users themselves or on their behalf) between the proposed recipient and other linked individuals are considered in the SRE heuristics. For example, where there are matching vertexes, only those that are of the "friend" or "neighbor" edge types may pass a filter.

In the fifth stage, the SRE 103 heuristics processes the matching keyword found in the previous stage. The SRE evaluates the data relationships asynchronously in real time to determine further action. Further actions may include: forwarding the notification to the proposed recipient; discarding it; or holding it pending other information or incoming notifications for synchronous evaluation within a configurable time period. While exact business logic is configurable, generally each of the keywords obtained is assigned a weight. A mathematical operation is performed that results in a score. If the score surpasses as pre-configured threshold, the notification may be released (forwarded) to the proposed recipient (i.e. client 101) via the network 102.

If forwarded to the recipient, additional tags can be placed on a copy of the notification in the SRE's database such that statistics resulting from the SRE's actions can then be further evaluated to modulate action on further instances of the same notification to other recipients or type of notification to all recipients. For example (referring to FIG. 4's example), Joe currently has some (but not much) interest in sports cars. So, notifications about sports cars may be withheld at the moment (as not meeting the threshold for relevance). But, if Joe develops a stronger interest in this topic, notifications may start to flow to Joe on this topic (or vice versa, as linkages may increase or decline dynamically).

Post-notification behaviour by the user (recipient) may also feedback into the user's social graph. For example, if the user completely ignores several notifications on a topic, the system may infer a waning interest in that topic and make the linkage or association weaker in the social graph. Conversely, if a user reads and acts on a notification right away, the interest in that topic may result in further strengthening of the linkage or association to trigger more notifications on this topic in the future.

Furthermore, if so configured, the SRE 103 may automatically forward the notification to other vertexes in the social network who may also find the notification of interest. For example, Joe and Bob both share an interest in New York, so notifications about New York-related topics may also be forwarded to Bob, but soccer notifications (e.g. regarding Euro Cup) would not be forwarded, since not relevant to Bob. For public notifications, heuristics similar to that applied to the original recipient is used when determining relevancy to new recipients. When the original notification is private, additional privacy or confidentiality configurations, typically by the original recipient, determine whether the notification is automatically forwarded to the original recipient's social network.

In summary, examination of keywords among connected vertexes can be thought of as the "relevance" portion of the SRE. Examination of related vertexes and exact nature of the relationship can be thought of as the "social" aspect of the SRE.

Various methods of querying a social graph are possible. One example (Facebook) offers a social graph that represents people and the connections they have to other people or things that they may care about. Facebook offers a well documented and established API, the Graph API, which presents a simple, consistent view of the Facebook social graph, uniformly representing objects in the graph (e.g., people, photos, events, and pages) and the connections between them (e.g., friend relationships, shared content, and photo tags). The Graph API as such allows a developer/application to access all public information about an object. The Graph API allows an application to read properties and connections of the Facebook social graph. A developer can use the API to read specific fields, get pictures of any object, introspect an object for metadata and get real-time updates on any changes.

To get this context sensitive information about a user that is not publicly available, a developer/application must first get their permission. To get this private information that is not publicly available, an application must get an access token for the Facebook user. After obtaining the access token for the user, the application can perform authorized requests on behalf of that user by including the access token in the Graph API requests. The permissions process is beyond the scope of the present description.

Every object in the social graph has a unique ID. A developer can access the properties of an object by sending a secure request using the URL https://graph.facebook.com/ID. Additionally, people and pages with usernames can be accessed using their username as an ID. All responses to these requests are sent as JavaScript Object Notation (JSON) objects.

All of the objects in the Facebook social graph are connected to each other via relationships. A developer can examine the connections between objects using the URL structure https://graph.facebook.com/ID/CONNECTION_TYPE. The Facebook Query Language (FQL) object enables running FQL queries using the Graph API. Facebook Query Language enables a developer to use an SQL-style interface to query the data exposed by the Graph API. It provides for some advanced features not available in the Graph API, including batching multiple queries into a single call.

friendlist
Query this table to return any friend lists owned by the specified user.
friendlist member
Query this table to determine which users are members of a friend list.

This is merely one example of a social graph. The intent of the application is to cover all such combinations and permutations not listed here but that are obvious to persons skilled in the art. The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all alternatives, modifications, and equivalents obvious to persons skilled in the art.

What is claimed is:

1. A computer-implemented method comprising:
receiving, by a social relevancy engine from a notification provider, a notification to be delivered to a plurality of users;
parsing the notification to determine a sender of the notification and a topic addressed in the notification;
computing a score indicating a relevance of the topic to a second user that is connected to the sender;
determining that the score is less than a first threshold value; and
in response, filtering the second user from a set of users to receive the notification.

2. The computer-implemented method of claim 1, further comprising:
preventing delivery of the notification to the filtered second user.

3. The computer-implemented method of claim 1, wherein the score is based on one or more of a degree of separation between the sender and the second user on a social graph, a directionality of linkage between the sender and the second user on the social graph, or a recency of the linkage between the sender and the second user on the social graph.

4. The computer-implemented method of claim 3, wherein:
the social graph comprises a plurality of nodes comprising a plurality of user nodes and a plurality of topic nodes;
the plurality of users are represented as respective nodes among the plurality of user nodes; and
the topic node is one of the plurality of topic nodes.

5. The computer-implemented method of claim 1, further comprising:
computing a score indicating a relevance of the topic to a third user that is not connected to the sender;
determining that the score is more than a second threshold value; and
in response, permitting delivery of the notification to the third user.

6. The computer-implemented method of claim 1, wherein the notification comprises one or more of an email, a text message, or an instant message.

7. The computer-implemented method of claim 1, further comprising:
obtaining, by the social relevancy engine, social graph data representing connections in a social graph between the plurality of users;
determining that a first user does not have at least a threshold number of connections in the social graph to other users included in the plurality of users receiving the notification; and
in response, filtering the first user from the set of users to receive the notification.

8. The computer-implemented method of claim 7, wherein determining that the first user does not have at least the threshold number of connections in the social graph to the other users receiving the notification comprises:
computing a score indicative of a number of connections between the first user and the other users receiving the notification; and
determining that the score is less than the threshold number of connections.

9. A system comprising:
at least one programmable processor; and
a machine-readable medium storing instructions that, when executed by the at least one programmable processor, cause the at least one programmable processor to perform operations comprising:
receiving, by a social relevancy engine from a notification provider, a notification to be delivered to a plurality of users;
parsing the notification to determine a sender of the notification and a topic addressed in the notification;
computing a score indicating a relevance of the topic to a second user that is connected to the sender;
determining that the score is less than a first threshold value; and
in response, filtering the second user from a set of users to receive the notification.

10. The system of claim 9, the operations further comprise:
preventing delivery of the notification to the filtered second user.

11. The system of claim 9, wherein the score is based on one or more of a degree of separation between the sender and the second user on a social graph, a directionality of linkage between the sender and the second user on the social graph, or a recency of the linkage between the sender and the second user on the social graph.

12. The system of claim 11, wherein:
the social graph comprises a plurality of nodes comprising a plurality of user nodes and a plurality of topic nodes;
the plurality of users are represented as respective nodes among the plurality of user nodes; and
the topic node is one of the plurality of topic nodes.

13. The system of claim 9, the operations further comprise:
computing a score indicating a relevance of the topic to a third user that is not connected to the sender;
determining that the score is more than a second threshold value; and
in response, permitting delivery of the notification to the third user.

14. The system of claim 9, wherein the notification comprises one or more of an email, a text message, or an instant message.

15. The system of claim 9, the operations further comprise:
obtaining, by the social relevancy engine, social graph data representing connections in a social graph between the plurality of users;
determining that a first user does not have at least a threshold number of connections in the social graph to other users included in the plurality of users receiving the notification; and
in response, filtering the first user from the set of users to receive the notification.

16. The system of claim 15, wherein determining that the first user does not have at least the threshold number of connections in the social graph to the other users receiving the notification comprises:
computing a score indicative of a number of connections between the first user and the other users receiving the notification; and
determining that the score is less than the threshold number of connections.

17. A non-transitory computer program product storing instructions that, when executed by at least one programmable processor, cause the at least one programmable processor to perform operations comprising:
receiving, by a social relevancy engine from a notification provider, a notification to be delivered to a plurality of users;
parsing the notification to determine a sender of the notification and a topic addressed in the notification;
computing a score indicating a relevance of the topic to a second user that is connected to the sender;
determining that the score is less than a first threshold value; and
in response, filtering the second user from a set of users to receive the notification.

18. The non-transitory computer program product of claim 17, the operations further comprise:
obtaining, by the social relevancy engine, social graph data representing connections in a social graph between the plurality of users;
determining that a first user does not have at least a threshold number of connections in the social graph to other users included in the plurality of users receiving the notification; and
in response, filtering the first user from the set of users to receive the notification.

19. The non-transitory computer program product of claim 18, wherein determining that the first user does not have at least the threshold number of connections in the social graph to the other users receiving the notification comprises:
  computing a score indicative of a number of connections between the first user and the other users receiving the notification; and
  determining that the score is less than the threshold number of connections.

20. The non-transitory computer program product of claim 17, the operations further comprise:
  preventing delivery of the notification to the filtered second user.

* * * * *